United States Patent [19]

Verner et al.

[11] 4,201,527

[45] May 6, 1980

[54] APPARATUS FOR MANUFACTURING TUBULAR THERMOPLASTIC

[75] Inventors: David A. Verner, Bound Brook; Henry A. Kipp, Bridgewater, both of N.J.

[73] Assignee: Egan Machinery Company, Somerville, N.J.

[21] Appl. No.: 920,686

[22] Filed: Jun. 30, 1978

[51] Int. Cl.² .................................................. B29D 7/22
[52] U.S. Cl. ............................ 425/72 R; 264/565; 425/326.1; 425/387.1
[58] Field of Search .............. 425/387.1, 326.1, 72 R; 264/565

[56] References Cited

U.S. PATENT DOCUMENTS

| | | | |
|---|---|---|---|
| 2,966,700 | 1/1961 | Dyer et al. | 264/95 |
| 3,307,219 | 3/1967 | Bigland | 425/72 |
| 3,577,488 | 5/1971 | Bigland | 425/72 |
| 3,714,309 | 1/1973 | Bigland | 425/72 |
| 3,810,725 | 5/1974 | Trub et al. | 264/95 |
| 3,852,392 | 12/1974 | Davis et al. | 425/326 R |
| 3,958,913 | 5/1976 | Stangl | 425/72 R |
| 3,976,411 | 8/1976 | Rahlfs | 425/326.1 |

*Primary Examiner*—Jeffery R. Thurlow
*Attorney, Agent, or Firm*—Weingram & Klauber

[57] ABSTRACT

A variable size deflector disc directs cooling gas to the internal surfaces of a tubular plastic film drawn between an extruder die and a pair of rollers. The disc facilitates the starting process for pulling a narrow diameter tubing from the extruder over the disc to the rollers. The plastic tub can then be readily enlarged to the final maximum diameter followed by expansion of the deflector disc to control the flow of cooling gas. The disc is preferably in the form of an iris having a plurality of pivotable leaves which can be expanded outwardly from a contracted position. The outer edge of the leaves are designed to provide a relatively smooth rounded circumference of the variable diameter disc throughout the variation in diameter between the minimum and maximum tube dimensions for the tubular plastic film process. The expandable disc permits more efficient cooling and more rapid production of the plastic film.

16 Claims, 4 Drawing Figures

APPARATUS FOR MANUFACTURING TUBULAR THERMOPLASTIC

BACKGROUND OF THE INVENTION

1. Field of the Invention:

The present invention relates to apparatus for manufacturing tubular thermoplastic film and particularly to a variable size deflector which facilitates the starting process and provides more efficient control of internal cooling gas.

2. Statement of Prior Art:

In the known process for manufacturing tubular thermoplastic film, a plastic tube is extruded through a vertical die and inflated to a desired diameter by the pressure and volume of gas or air flowing in a central conduit. The enlarged tube is cooled as it passes over a disc which directs internal air at the film while additional external air is directed at the outer surfaces. The tube is then drawn upwardly through and flattened by a pair of rollers. An example of this prior art process is found in U.S. Pat. No. 2,966,700 issued Jan. 3, 1961. It has also been known to utilize a plurality of axially spaced internal discs to provide improved stability and control of cooling air, as shown in U.S. Pat. No. 3,976,411 issued Aug 24, 1976.

A serious problem, however, is encountered in the starting process when the thin heated plastic tube from the narrow extruder die is pulled over the wider diameter disc to the windup rollers. The ratio of the maximum diameter of the tube to the diameter at the exit of the extruder die, known as the "blow up ratio" is generally in the order of from 1.5 to 4:1, with the deflector disc being only slightly smaller in diameter than the maximum dimension of the tube. It is therefore extremely difficult to pull the small size extruded tube over the large deflector disc when starting, particularly since the tube cannot trap air and be blown up to a larger size until passing through the nip rolls which collapse and draw the tube upwardly.

Additionally, when using a fixed diameter deflector disc, the size of the tube cannot be varied without replacing the deflector disc. In order to do so, the entire operation must be shut down, and then the entire starting process repeated with all the difficulties previously described.

Known possible solutions for this problem include an internal pneumatic inflatable forming device which can be expanded from a narrow to wider dimensions to control the size of the tube, as shown in U.S. Pat. No. 3,307,219 issued Mar. 7, 1967, and a mechanically expandable device having a plurality of arcuate nozzles disposed on the ends of movable linkages or plungers, as in U.S. Pat. No. 3,810,725 issued May 14, 1974. The first type, however, is capable of only limited expansion and cannot provide adequate control of gas flow as is obtainable with a thin disc type deflector, while the second device does not provide a continuous smooth peripheral surface in the expanded position. In addition, the arcuate nozzle sections provide a circular contour only at the contracted diameter position and cannot match the desired curvature of the plastic tube at the maximum diameter.

SUMMARY OF THE INVENTION

To overcome the problems of prior art, the present invention provides a deflector disc in the form of an iris having a plurality of overlapping pivotable leaves which expand outwardly from a contracted position. The leaves are connected at one end to a rotatable disc and at the other end to pivotable extension arms connected to a stationary disc. An air motor coupled with the deflector disc within the expanded tube area is coupled to the rotatable disc to move the leaves outwardly when rotating in one direction and inwardly when rotating in the opposite direction. External controls are provided to connect to the internal motor to vary the diameter of the iris. The curvature of each leaf is designed so that a substantially circular perimeter is maintained by the deflector disc throughout the range of variation between minimum and maximum dimensions to provide a smooth rounded tubular plastic film.

It is therefore an object of the present invention to provide an apparatus for forming tubular thermoplastic film having an internal deflector disc for controlling the application of cooling air.

It is another object of the present invention to provide an apparatus for forming tubular thermoplastic film having an internal deflector which can be varied in size from a narrow diameter close to that of the extruder die to a large diameter substantially equal to the maximum desirable tubular diameter in order to facilitate the starting process of pulling the tube from the extruder over the disc to the wind-up rollers.

Still another object of the present invention is to provide an apparatus for forming tubular thermoplastic film having an internal deflector disc that can be adjusted in size to enlarge or contract the diameter of the disc during operation of the apparatus performing tubular thermoplastic film without having to interrupt the flow of film.

A further object of the present invention is to provide an apparatus for forming tubular thermoplastic film having an internal deflector disc which can be altered in size from a position remote from the location of the disc so as not to interrupt operation of the apparatus.

Yet another object of the present invention is to provide an apparatus for forming tubular thermoplastic film having a variable diameter deflector disc which retains a substantially circular periphery throughout the variation in diameter of the disc from minimum to maximum expanded dimensions and visa versa.

A further object of the present invention is to provide a variable deflector disc for use in an apparatus for forming tubular thermoplastic film which can be adjusted in size and still maintain a uniform distribution of air flow to the thermoplastic material being cooled by air deflected from the disc.

Other objects and advantages will be apparent from the following description of several embodiments of the invention, and the novel features will be particularly pointed out hereinafter in connection with the appended claims.

DESCRIPTION OF THE PREFERRED EMBODIMENT

Figure 1:
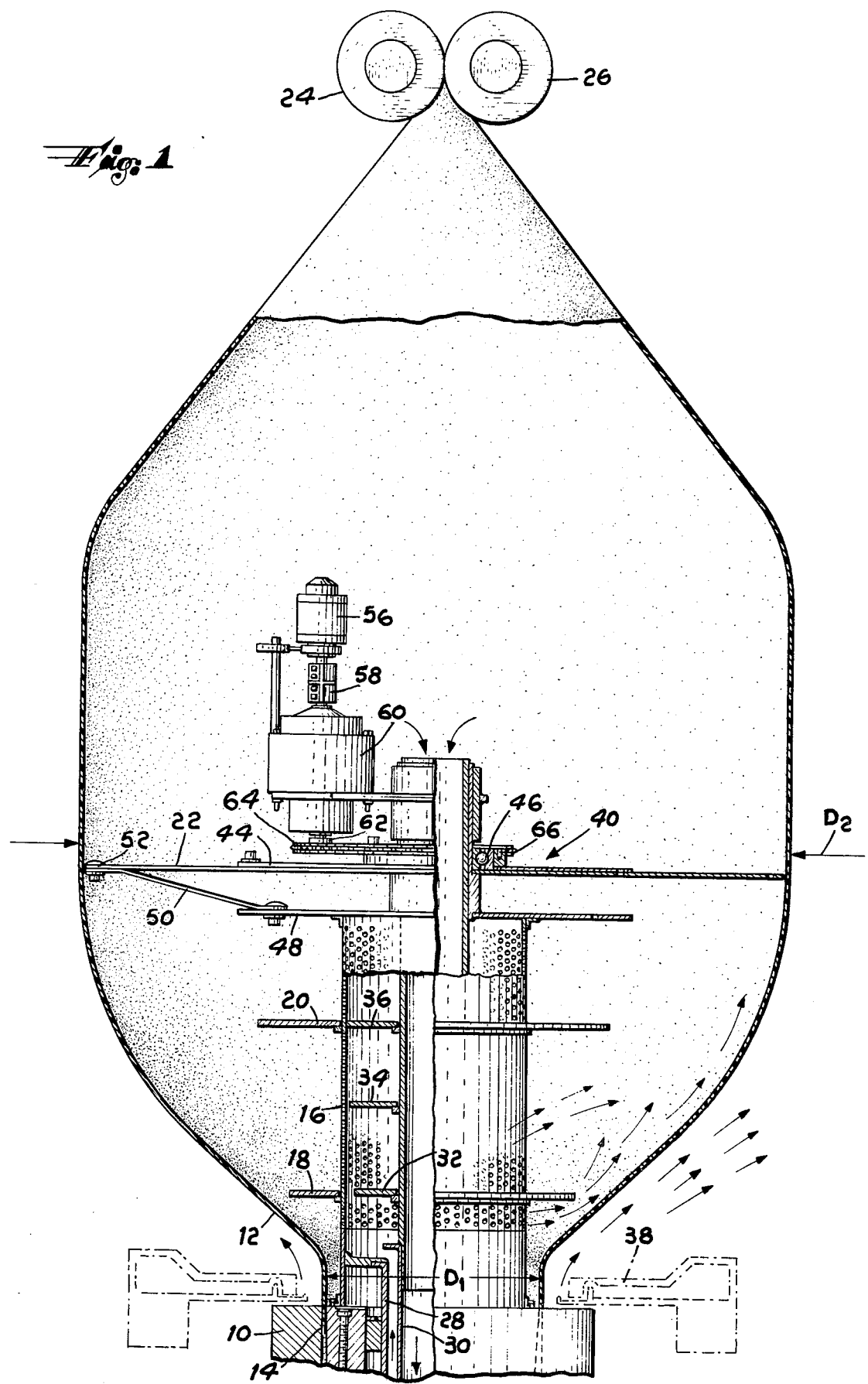
FIG. 1 is a side view in partial section of the apparatus of the present invention.

As shown in FIG. 1, the upper portion of an extruder die 10, used for forming blown tubular thermoplastic film 12, includes an annular orifice 14 providing a thin heated plastic tube having an initial relatively small diameter D1. The tube is drawn upwardly around a perforated cylindrical pipe 16, a plurality of flat circular discs 18, 20, and a deflector disc 22, by a pair of windup rollers 24, 26. Cooling gas or air is circulated upwardly through an outer passage between a central vertical pipe 28 and a coaxial inner pipe 30 which carries the returning air in a downward path. The cooling air passes through the perforations in pipe 16 mounted on the upper face of the die 10 and is distributed to the interior of the plastic tube 12 guided by graduated baffle plates 32, 34, 36 secured along the inner pipe 30, and fixed discs 18,20 spaced above the die on pipe 16. External cooling air is applied to the outer surfaces of the heated plastic tube by a conventional external air ring 38 mounted adjacent the top of die 10.

The upward flow of internal cooling air is controlled by deflector disc 22 which is spaced closely to the inner surface of plastic tube 12 at the expanded diameter of the tube D2. Rollers 24, 26 collapse and flatten the plastic tube to prevent escape of the air so that pressure within the tube is maintained above that of the atmosphere. This permits the heated plastic to expand or blow up to the desired diameter D2, at which point the material has cooled sufficiently to prevent further expansion. The returning air enters through the top of inner coaxial pipe 30 and is withdrawn through die 10. Discs 18, 20 are of somewhat larger graduated diameters with respect to the narrow diameter of the die but are not large enough to cause difficulty in the starting process of originally drawing the plastic film from the die up to the rollers.

Figure 2:
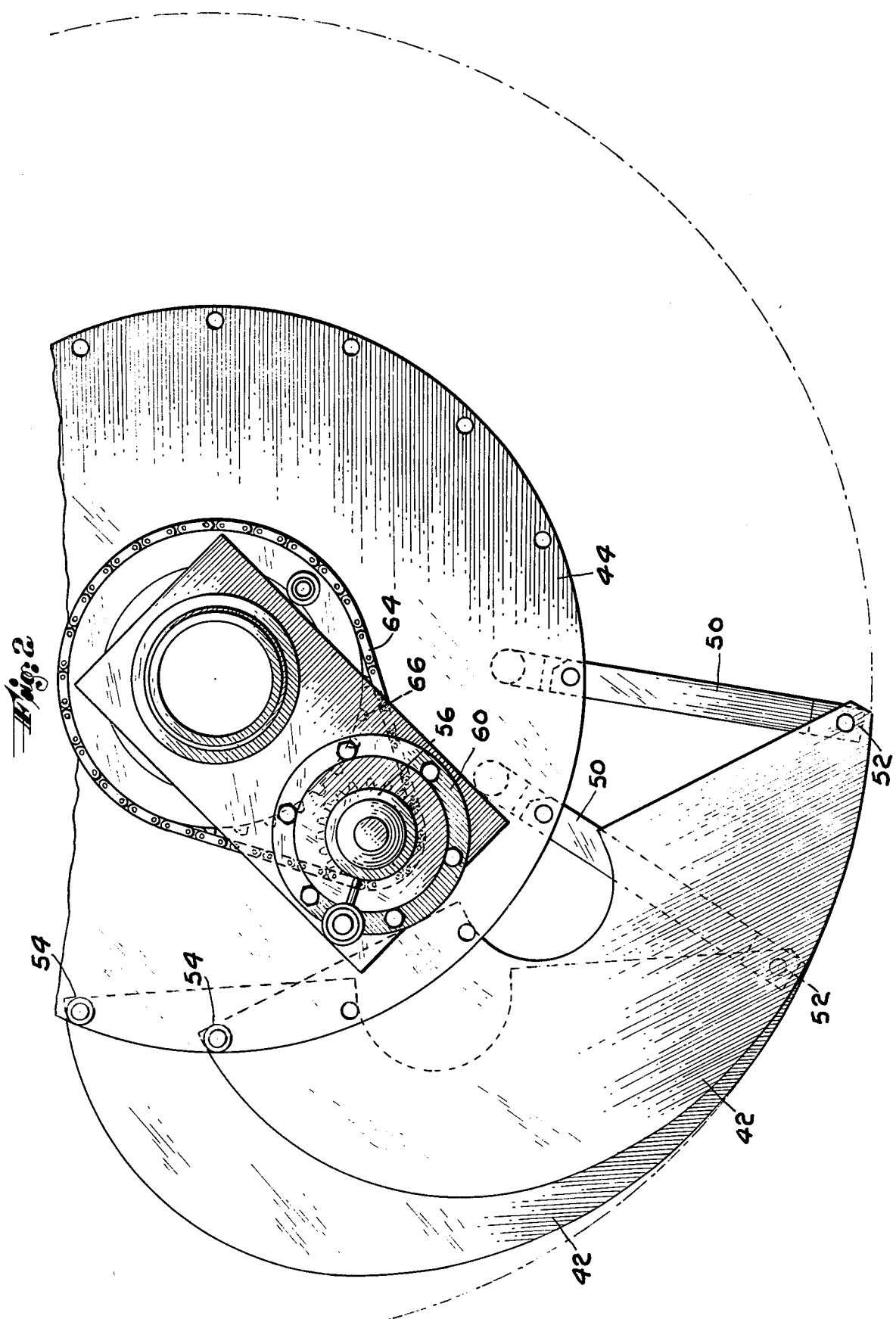
FIG. 2 is a plan view showing the mechanism for varying the diameter of the deflector disc.

Mounted at the top of inner pipe 30 above pipe 16 is the deflector disc assembly 40 including variable diameter deflector disc 22. Deflector disc 22 is formed of a plurality of like leaves 42, preferably sixteen, some of which are shown in FIG. 2. The leaves are pivotably mounted between an upper rotatable disc 44, secured to a bearing 46, rotatable around pipe 30, and a lower stationary disc 48 on pipe 30. A plurality of pivotable extension arms 50 secured by rivets at opposite ends connect the outer expandable ends 52 of the respective leaves to the outer periphery of the stationary disc 48 at spaced arcuate positions. The opposite or inner ends 54 of the leaves are also secured by rivets or pins to the rotatable disc 44 at spaced arcuate positions around the periphery.

The leaves are in the shape of overlapping arcuate segments forming an iris having an outer diameter which expands when the leaves are rotated in one direction and which contracts to a smaller diameter when rotated in the opposite direction. The variation in diameter of the deflector disc and movement of the iris leaves are preferably controlled by an air powered motor 56 mounted on the upper end of pipe 30 over rotatable upper disc 44.

Compressed air for the motor is supplied through suitable internal piping while the controls are located externally. The motor is coupled to the disc 44 by suitable coupling members 58, gear reducer 60, sprocket drive and wheel 62, chain 64, and sprocket wheel 66 secured to bearing 46.

The motor can be actuated to rotate the operative parts in either direction. When the motor is actuated to rotate disc 44 in a counterclockwise direction, for example, the ends 52 of the leaves 42 push the arms 50 outwardly from the stationary disc 48 as the leaves pivot about ends 54 and 52. This will thus expand the outer diameter of the iris. A clockwise rotation of disc 44 will then move the leaves to cause a contraction of the arms 50 toward disc 48 and result in a reduced diameter of the iris. FIG. 2 shows the leaves in the expanded position.

Figure 3:
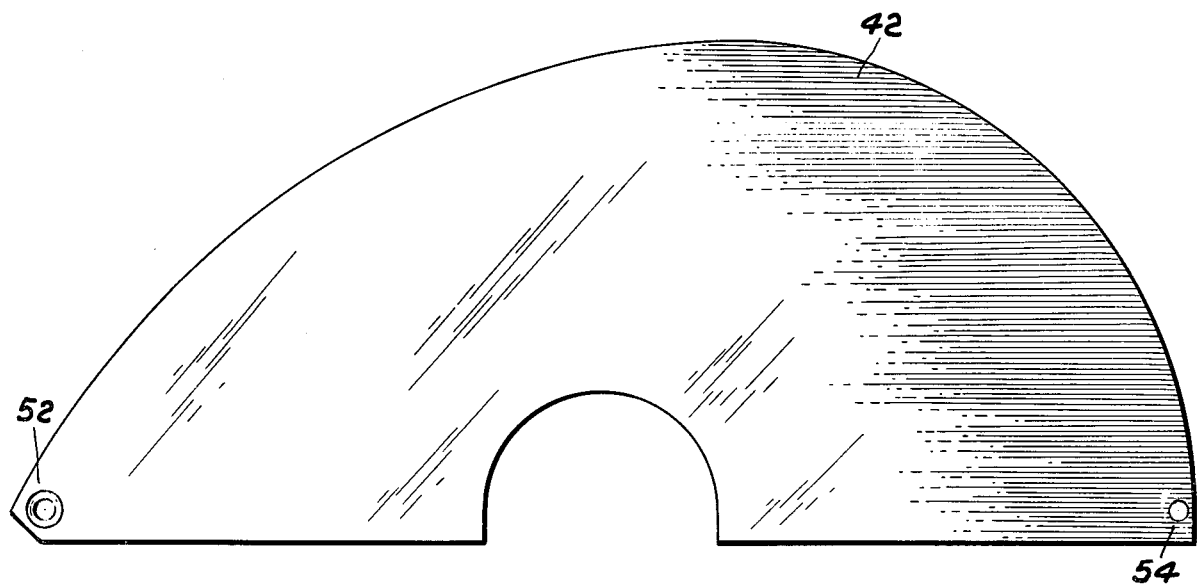
FIG. 3 is a plan view of the preferred contour of a single leaf.
Figure 4:
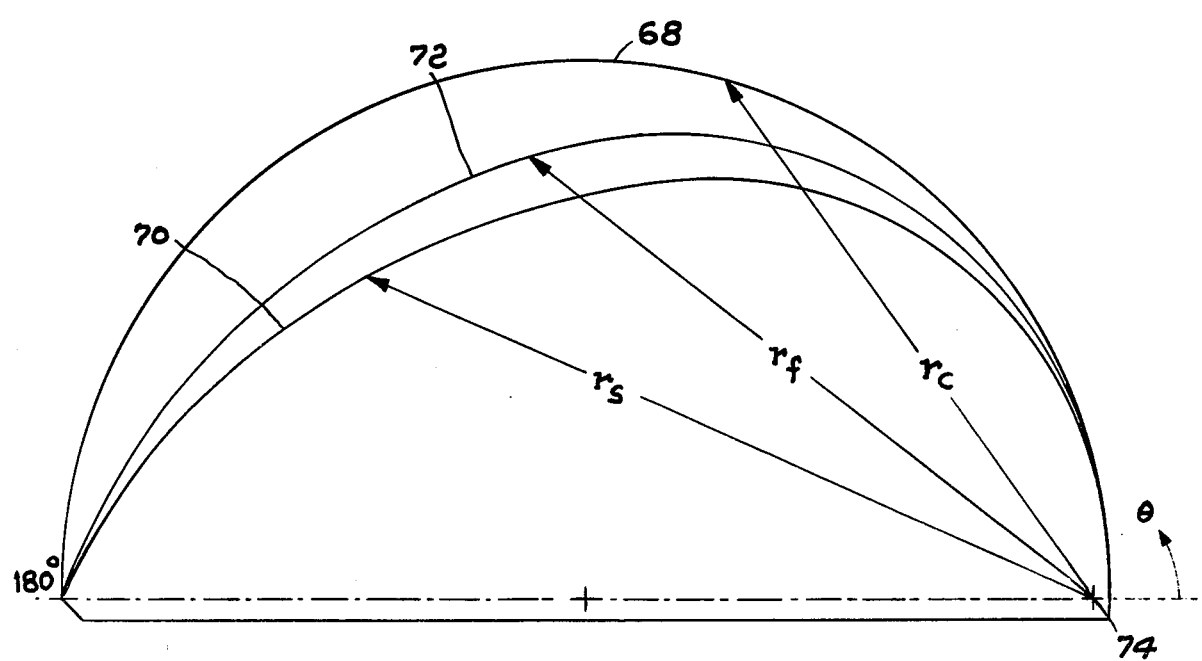
FIG. 4 is a representative view of several leaf contours.

A typical single leaf having a preferred contour is shown in FIG. 3, while several alternative leaf configurations are illustrated in FIG. 4. Semicircular leafs were found to be unsatisfactory. Since the variable diameter disc or iris should be capable of expanding from 1.5 to 4 times the minimum diameter, while maintaining a substantially circular shape a semicircular leaf 68 could provide the desired smooth contour at only one contracted position. As the leaves are pivoted to expand in diameter, semicircular leaves would cause indentations or a scalloped outline at the cross over points. Such a scalloped disc edge would cause an undesirable changing gap and periodic variations in air flow around the circumference of the plastic film tube which would worsen at larger diameters. This would cause film wrinkles and nonuniform film properties as a result of different cooling rates and shrinkages.

A disc formed of a spiral leaf contour 70 having a variable radius was found to have a much decreased ripple which diminished further with increased expansion. However, the spiral contour was found to provide an expansion of only about 1.7 times the minimum diameter before the outer corners of the overlapping leaves became exposed, while the circular leaf could expand to 2.7:1 ratio.

A final contour 72, which was a compromise between the spiral and circular contours, was then selected as the best design providing an expansion ratio of 2.1:1 with insignificant ripple in the maximum position. The common pivot point for the leaves is indicated at 74.

The following equations were developed for the various contours based upon an 18 inch minimum diameter variable disc. The polar equation for the circular contour is:

$$r_c = \sqrt{9^2 - (8.75 \sin \theta)^2} - 8.75 \cos \theta$$

where $r_c$ and $\theta$ are indicated on FIG. 4. The spiral contour polar equation is:

$$r_s = 0.1757\theta - 13.876$$

The final contour equation is a combination of the two equations:

$$r_f = r_s + F(r_c - r_s)$$

where F is a proportioning factor that positions the final contour between the first two curves depending upon the angular positon. The proportioning factor is:

$$F = 1.01 - 0.00467\theta$$

The equations for rs, rf and F are valid only in the interval of from 90 to 180 degrees. The equation for rc is valid from 0 to 180° and beyond. Different size leaves are simply scaled up or down from the basic 18 inch size. In some cases the spiral, circular or other combined contours may also be found to be useful.

In operation, the extruded plastic tube is strung up over the deflector disc in the contracted position, with the tube let into the collapsing nip rollers. The tube is then blown to the desired diameter and the deflector disc expanded to a corresponding operating diameter.

The present invention thus provides a variable diameter deflector disc which facilitates the manufacture of tubular thermoplastic film and permits efficient control of cooling air. By being capable of expanding from a small diameter to a relatively large diameter during operation of the apparatus, the start of procedure is greatly facilitated. It is no longer necessary to stretch and manipulate the hot thermoplastic tube extruded from the die to its maximum diameter in order to clear the operating parts of the apparatus. Instead, the apparatus is started with the thermoplastic tube in a relatively small diameter and once the apparatus is operating on a continuous basis with the tube completely formed and drawn by the wind-up rollers, the tube can be expanded to its desired operating size and the deflector plate then expanded accordingly.

Further, since the size of the deflector plate can be increased or decreased during operation of the tube forming apparatus, it is possible to produce tubes of varying size in a continuous process. All that need be done is control the size of the disc in accordance with the size of the tube desired.

Further, although the size of the deflector plate can be adjusted, the apparatus provides a relatively smooth continuous contour on the perimeter of the deflector plate and thereby maintains a uniform flow of cooling air between the periphery of the deflector plate and the inner surface of the tube, which results in the production of tubes of high uniformity and therefore of high quality standards.

Additionally, it should be pointed out that because the apparatus reduces the necessity for shutting down the tube-making process, the equipment itself does not experience as many start-up and shut-down procedures. Therefore the reliability of the equipment is enhanced and the useful service life extended.

It will be understood that various changes in the details, materials and arrangements of parts which have been herein described and illustrated in order to explain the nature of the invention may be made by those skilled in the art within the principle and scope of the invention, as expressed in the appended claims.

What is claimed is:

1. Apparatus for forming tubular thermoplastic film comprising:
   a die for extruding a tubular film of thermoplastic material of a first diameter,
   a central conduit extending through said die and providing a source of gas for expanding said film to a second enlarged diameter and for cooling said film, said conduit including an inner passage with an opening for the return flow of said gas,
   a pair of rollers spaced from said die for drawing and flattening said film, and
   a variable outer diameter deflector disc positioned around said conduit between said die and rollers for controlling the flow of cooling gas at the internal surface of said film leaving said die, said disc being expandable from a diameter of reduced size to a diameter of increased size close to that of said enlarged diameter film; and
   means for varying the outer diameter of said variable outer diameter deflector disc associated with said variable outer diameter deflector disc.

2. The apparatus of claim 1 wherein said variable diameter deflector disc is in the form of an iris including a plurality of overlapping arcuate segmented leaves pivotally mounted around said conduit, and driving means for controlling the movement of said leaves inwardly and outwardly between said reduced size and increased size diameters.

3. The apparatus of claim 2 wherein said variable diameter disc is mounted on said conduit below said opening for the return flow of gas.

4. The apparatus of claim 3 wherein said variable diameter disc includes first disc rotatably mounted on said conduit, said leaves having one end pivotally connected to said first disc, a second disc secured on said conduit and a plurality of supporting arms pivotally connected between said second disc and the other end of said leaves, said driving means controlling the rotation of said first disc so that rotation in one direction moves the leaves and arms outwardly to said increased size diameter and rotation in the opposite direction moves the leaves and arms inwardly to said reduced size diameter.

5. The apparatus of claim 4 wherein each of said leaves has an outer edge having a curvature which increases from one end to the other end.

6. The apparatus of claim 5 wherein the outer periphery of said variable diameter disc is substantially smooth and circular throughout the variation in diameters between said increased and decreased sizes.

7. The apparatus of claim 4 wherein said driving means is an air powered motor mounted on said central conduit and includes a rotatable shaft coupled to one of said first and second disc, the other of said discs being non-rotatable relative to the disc coupled to said rotatable shaft.

8. The apparatus of claim 7 wherein said gas is air and said conduit includes an outer coaxial passage and perforated pipe directing cooling air at said internal surfaces of said film below said variable diameter disc.

9. The apparatus of claim 8 including a plurality of baffle plates spaced along said outer passage and a plurality of discs spaced along said perforated pipe.

10. The apparatus of claim 8 including an external air ring mounted on said die for directing cooling air at the external surfaces of said film leaving said die.

11. In an apparatus for forming tubular thermoplastic film including a die for extruding a tubular film of thermoplastic material of a first diameter, a central conduit extending through said die and providing a source of gas for expanding said film to a second enlarged diameter and for cooling said film, said conduit including an inner passage with an opening for the return flow of said gas, and a pair of rollers spaced from said die for drawing and flattening said film, the improvement comprising:
   a variable outer diameter deflector disc positioned around said conduit between said die and rollers for controlling the flow of cooling gas at the internal surfaces of said film leaving said die, said disc being expandable from a diameter of reduced size to a diameter of increased size close to that of said enlarged diameter film; and
   means for varying the outer diameter of said variable outer diameter deflector disc associated with said variable outer diameter deflector disc.

12. The apparatus of claim 11 wherein said variable diameter reflector disc is in the form of an iris having a plurality of overlapping arcuate segmented leaves pivotally mounted around said conduit, and driving means for controlling the movement of said leaves inwardly and outwardly between said reduced size and increased size diameters.

13. The apparatus of claim 12 wherein said variable diameter disc includes a first disc rotatably mounted on said conduit, said leaves having one end pivotally connected to said first disc, a second disc secured on said conduit, and a plurality of supporting arms pivotally connected between said second disc and the other end of said leaves, said driving means controlling the rotation of said first disc to move the leaves and arms outwardly to said increased diameter in one direction and inwardly to said reduced diameter in the opposite direction.

14. The apparatus of claim 13 wherein each of said leaves has an outer edge having a curvature which increases from one end to the other end.

15. The apparatus of claim 14 wherein the outer periphery of said variable diameter disc is substantially smooth and circular throughout the variation in diameter between said increased and decreased sizes.

16. The apparatus of claim 15 wherein said driving means is an air powered motor mounted on said central conduit and includes a rotatable shaft coupled to said upper disc.

* * * * *